United States Patent [19]

Dale et al.

[11] 3,849,900
[45] Nov. 26, 1974

[54] FLUID BED AIR DISTRIBUTION APPARATUS AND DRYING METHOD

[75] Inventors: Robert F. Dale, Brookfield; Thomas P. Rhodes, Whitefish Bay; Joseph M. DeNucci, Beloit, all of Wis.

[73] Assignee: Universal Foods Corporation, Milwaukee, Wis.

[22] Filed: July 2, 1973

[21] Appl. No.: 376,039

[52] U.S. Cl. .................. 34/10, 34/57 D, 259/4, 259/DIG. 17
[51] Int. Cl. ............................................. F26b 3/08
[58] Field of Search ......... 34/10, 57 R, 57 A, 57 D, 34/57 E; 432/15, 58; 259/4, DIG. 17

[56] References Cited
UNITED STATES PATENTS

| | | | |
|---|---|---|---|
| 2,336,017 | 12/1943 | Jewell et al. | 34/10 |
| 2,813,351 | 11/1957 | Godel | 34/57 A X |
| 2,856,264 | 10/1958 | Dunn, Jr. | 34/10 X |
| 2,856,273 | 10/1958 | Beber et al. | 34/57 A X |
| 3,214,844 | 11/1965 | Oates et al. | 34/10 |
| 3,529,359 | 9/1970 | Fukuyo | 34/57 E |
| 3,662,474 | 5/1972 | Huthwaite | 34/10 UX |
| 3,780,445 | 12/1973 | Hansen | 34/57 D |

FOREIGN PATENTS OR APPLICATIONS

| | | | |
|---|---|---|---|
| 1,027,375 | 4/1966 | Great Britain | 34/57 A |
| 1,042,491 | 11/1953 | France | 34/57 A |

Primary Examiner—Manuel A. Antonakas
Assistant Examiner—William C. Anderson
Attorney, Agent, or Firm—Neuman, Williams, Anderson & Olson

[57] ABSTRACT

A fluid bed apparatus for drying solid particulate material is disclosed, more particularly, a fluid bed apparatus incorporating a rotating apertured disc positioned at a point removed from contact with the material to be dried to direct rotating streams of air through a bed of particulate material to fluidize and provide a mixing action to the same, thereby reducing fixed channeling in the fluid bed and producing a more uniform drying of product and an increase in productivity. Methods employing such apparatus for drying solid particulate materials are also disclosed.

11 Claims, 8 Drawing Figures

3,849,900

FLUID BED AIR DISTRIBUTION APPARATUS AND DRYING METHOD

BACKGROUND OF THE INVENTION

1. Field of the Invention

This invention relates to fluid bed driers and more particularly to fluid bed drier apparatus for maintaining substantially the entire mass of a solid particulate product in a uniform, fluidized, turbulent and pulsating state and to methods of drying products by the use of such an apparatus.

2. Description of the Prior Art

Fluid bed apparatus are well known in the art. They have been used for drying solid materials by use of a stream of fluidizing gases which are passed through a bed of finely divided particulate material in a so-called fluidizing chamber. These chambers are frequently cylindrical in form and have at their bottom portions a perforate or screen-like element which is of such construction that the apertures in the screen are sufficiently small to retain the solid particulate but permit a flow of air or other fluid therethrough, with the objective that the air current or other gaseous fluid medium will pass through the bed of finely divided solid material retained above the screen.

In normal operation of the fluid bed driers of the prior art, sufficient air is passed through the chamber to suspend the solid particles in a stream of air or other gaseous fluid, the objective being to bathe each particle with a stream of air thereby producing the so-called "fluid bed" and, hopefully, achieving rapid drying throughout the entire mass.

Obviously, in the case of a non-fluidized particulate mass dried by applying heat to the bottom of the mass, drying depends upon thermal transfer and currents to heat the particles of the entire mass to the point where the liquid component of the particles which is intended to be driven off is vaporized and migrates through the spaces between the particulate material and then to the atmosphere. This requires highly localized heat which could be detrimental to the product being dried. Even with mechanical agitation, the convection of heat and movement of vapors is slow and local overheating still remains a problem.

One of the difficulties recognized in the art employing fluid bed drying apparatus and techniques is that localized heavy streams of air tend to develop in the particulate bed, thereby creating channeling wherein the particles in the channel are driven by the air stream into violent agitation but other particles away from the channel are in a relatively quiescent and perhaps static, non-moving, non-fluidized state and are not subjected to the desired flow of currents of air over their surface necessary for drying. This problem has been alleviated by a variety of means in the past, including mechanical agitation of the mass in conjunction with passage of air or other gaseous medium through the bed to break up the channels which form. Mechanical agitation and contact with the particles however is undesirable in many instances where particles tend to crush, smear or agglomerate as in the case of, say, cheese particles.

For example, Lowe in U.S. Pat. No. 3,217,421 illustrates a plurality of fans placed beneath a moving screen or mesh belt. A series of louvres are placed immediately beneath the mesh belt and serve to deflect the air stream angularly through that belt through the products placed thereon.

Grevenstuck, et al., U.S. Pat. No. 3,202,731. discloses the use of a stirrer in a fluid bed apparatus to agitate a bed as described above.

Berry, U.S. Pat. No. 2,750,681, is a traditional fluid bed apparatus which employs as an alternate embodiment a plurality of louvres or flap valves moving by a piston to accomplish a shifting current of air to avoid channeling of the bed.

Elder, U.S. Pat. No. 2,761,769, is a fluid bed system which employs a cone-shaped retaining screen which self-rotates and is intended to feed streams of gas through apertures in the cone which is in direct contact with the contents of the bed.

While these prior art devices serve a useful purpose, they do not eliminate all of the problems which are encountered in the art of drying fragile products, especially food products which are intended to be recovered essentially in the same form after drying as before, without crumbling or reducing to paste as in the case of a product like cheese in shredded or noodle form. In cheese or cheese-like products, it is also desired to obtain a "dried" product which has a predetermined uniform moisture content and which does not exhibit oil separation caused by localized excessive heat. It is further desired to provide a process which minimizes the volatilization of flavor compounds in certain products, such as cheese, which occurs where there is excessive or prolonged heating. The prior art apparatus also have design characteristics which tend to create problems from the point of view of cleanliness and contamination of product, especially food product, is undesirable.

SUMMARY OF THE INVENTION

The present invention relates to an improved fluid bed apparatus for drying solid particulate material of delicate nature under fluidized bed conditions, which apparatus is characterized by the use of a rotating apertured plate or disc below and out of contact with the product to channelize and deliver a stream or streams of air moving in rotary fashion throughout the fluidized bed chamber. More particularly, the fluid bed drying apparatus of the present invention comprises a fluidizing chamber having a bottom or inlet means and a top or outlet means; a reticulated screen-like retaining means at the inlet portion of the chamber to retain particles in the chamber but permit the passage of air or other gases therethrough; a rotatable disc positioned adjacent to and below the inlet having apertures therein, which apertures comprise from one-sixteenth to one-half of the open area of the screen means; means for rotating the disc; and means for introducing a current of drying air through the rotatable disc, retaining means and fluidizing chamber.

A method of fluid bed drying of friable particulate products is also provided which comprises maintaining a bed of particulate material in a confined fluidizing zone and passing at least one rotating stream of air through said particulate bed to fluidize the particulate bed and dry the particles therein, said rotating air stream providing a rotating wave form to the fluidized bed sweeping the entire chamber and providing a pulsating mixing action to the fluidized particulate mass during the drying operation without the use of mechanical mixing means in contact with the particles in said fluid bed.

The fluid bed apparatus of the present invention employing rotating, localized, high velocity air streams, essentially eliminates gas channeling and minimizes agglomerization of the particulate material, resulting in more efficient fluidization and drying of the particulate.

DESCRIPTION OF THE PREFERRED EMBODIMENTS

Figure 1:
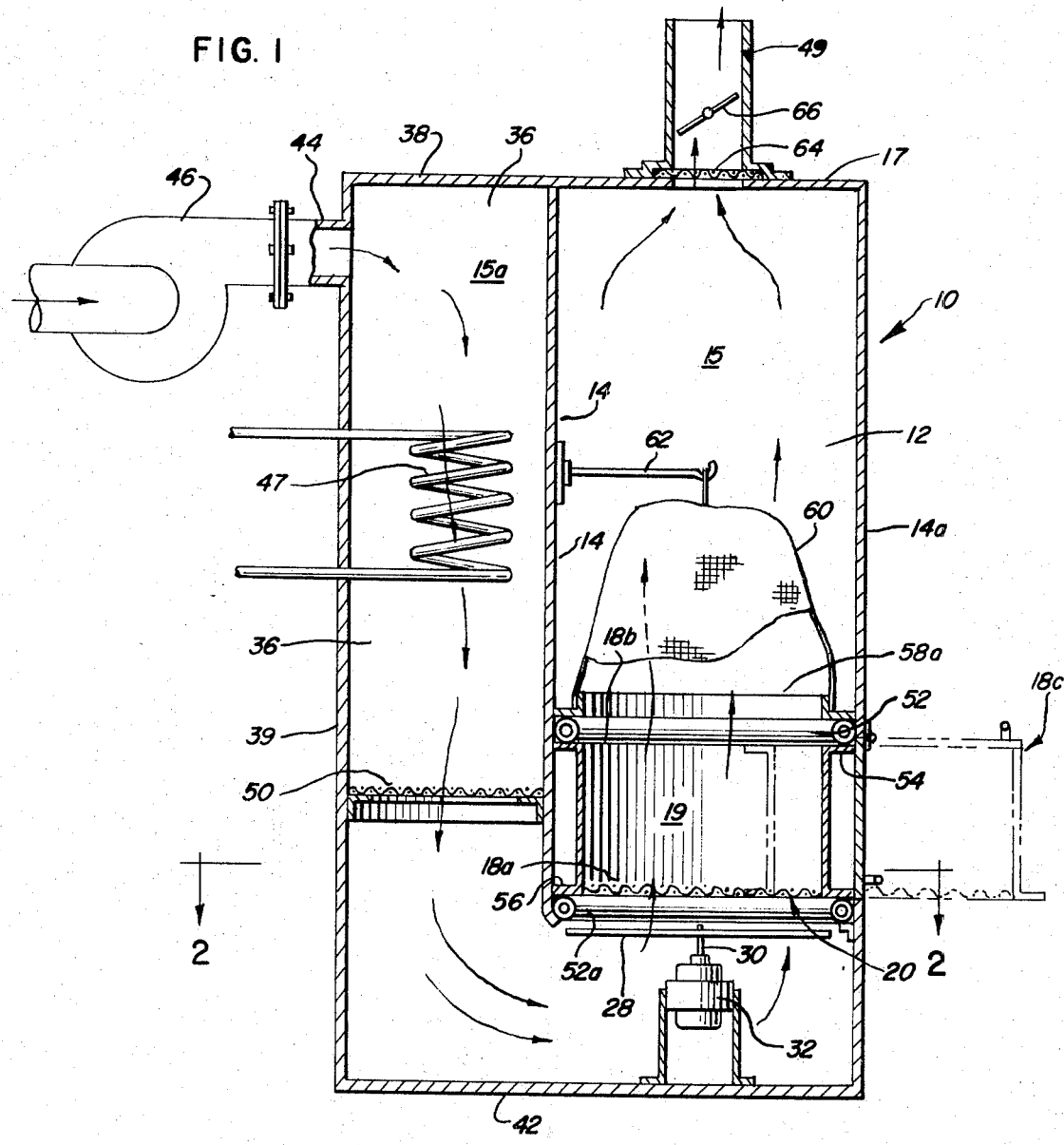
FIG. 1 is a schematic vertical elevation side view in section of the fluid bed drier apparatus of the present invention.

Referring to FIG. 1 of the drawing there is illustrated in side elevation schematic section, a fluid bed apparatus 10 comprising an exhaust plenum 12 in the form of an elongated rectangular chamber defined by side walls 14 and 14a, rear wall 15, front wall 16 and top 17. It is to be understood that in actual use, wall 14a is usually considered the "front" of the apparatus from the point of view of the operator. A removable product-containing, fluid bed chamber 18 is shown, cylindrical in form, having an inlet end 18a and outlet end 18b, provided with a screen-like retaining means 20 at the inlet end. The hopper-like chamber 18 is adapted to be removably placed directly under the exhaust plenum or chamber 12 when the fluid bed apparatus is in operation.

Figure 2:
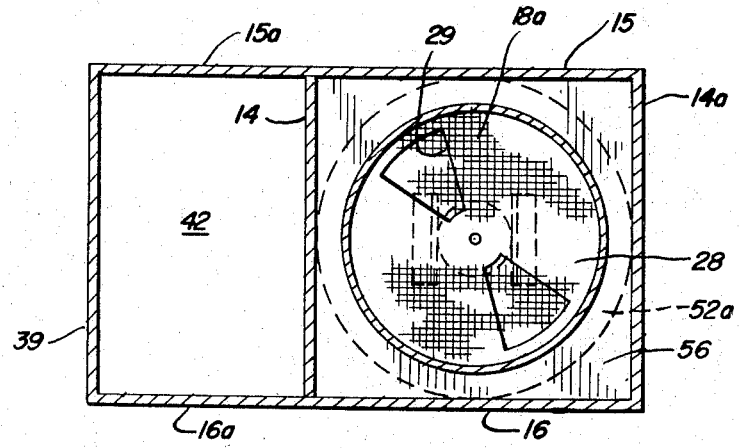
FIG. 2 is a sectional view taken along the lines 2—2 of FIG. 1 of the drawings showing a section of the fluid bed chamber used to contain the solid particulate undergoing drying.
Figure 3:
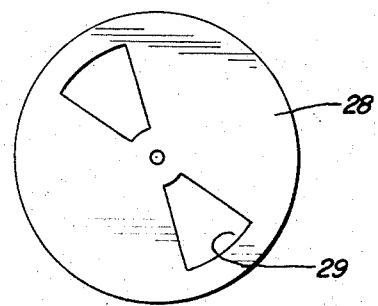
FIG. 3 is a top plan view of an air distributor disc employed in the apparatus of FIG. 1.
Figure 4:
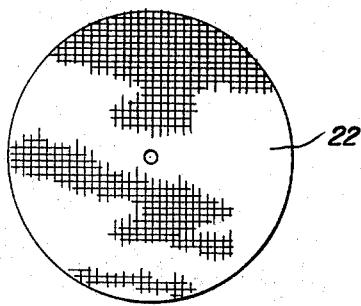
FIG. 4 is a top plan view of the screen also forming a part of the retaining means used in the apparatus of FIG. 1.
Figure 5:
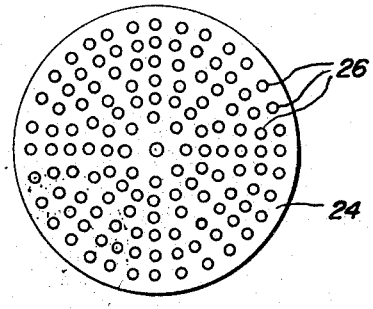
FIG. 5 is a top plan view of the support means forming a part of the reticulated retaining means and employed to support the screen shown in FIG. 4.

FIG. 2 shows a sectional view along the lines 2—2 through the product chamber 18. The chamber 18 is removable from apparatus 10 and rests on tracks or other support means (not shown) which support the chamber when positioned as shown in FIG. 1. The chamber in the removed position is also shown as the broken line figure 18c in FIG. 1 of the drawings. The screen-like retaining means 20 comprises two elements, one of which is a screen 22 (See FIG. 4) of a mesh size or pore size sufficient to retain the type of product that would be dried within the interior 19 of the chamber 18 such as 100 mesh stainless steel screen or perforated plate with 0.020 inch diameter holes with 20 to 50 percent open area and in a specific embodiment, 35 percent open area. Immediately beneath the screen 22 of retaining means 20 is a second element thereof, nanely, an apertured support means 24 (See FIG. 5) having a plurality of apertures 26. The apertures 26 are in sufficient number to permit free passage of air or gas therethrough. For example ¼ inch holes with from 25 to 50 percent open area and in a specific instance 40 percent open area is one particular embodiment. The screen 22 and apertured support means 24 together comprise the retaining means 20. Support means 24 provides sufficient strength to support the screen 22 and any product that rests thereon without sag, which might be the case if a screen were used alone.

A plate or disc structure 28 is mounted below the retaining means 20 and is provided with apertures or slots 29, all of such size as to constitute in area from about one-sixth to one-half of the total open area of the product retaining means composite which has an open area of from 10 to 50 percent of its total area.

The objective to be achieved is to obtain a linear air velocity of from 200 to 600 feet per minute through the screen without the disc 28 in place or alternatively stated, an open area or velocity sufficient to fluidize the particulate in chamber 18. The apertures 29 or openings in the disc 28 are of such size as to provide when the disc 28 is in place in the apparatus of FIG. 1 an increase in the local velocity of from about 1½ to 4 times the apparent linear velocity through the fill areas of the screen-like reticulated retaining means 20.

The disc 28 is approximately the same size as retaining means 20 which form the bottom of chamber 18 and is mounted for rotation just adjacent and below means 20 at the inlet end 18a of chamber 18. The mounting comprises affixing disc 28 at its center to the shaft 30 of motor or other drive means 32 affixed to and supported on base 42. The motor 32, when activated, rotates its shaft 30 and spins the disc 28 at a predetermined speed.

The apparatus 10 is provided with an inlet plenum or chamber 36 comprising top wall 38, side wall 39 and side wall 14, which latter is a common wall with chamber 12, a rear wall 15a, also common with rear wall 15 of chamber 12 and a front wall 16a which may also be common with wall 16 of chamber 12. A common bottom wall 42 is provided which also functions as a support base for apparatus 10.

An inlet duct 44 is provided with a cooperating fan 46 which serves to drive air or other gas into the chamber 36 downwardly in the direction of the arrows, through the rotating disc 28 and retaining means 20, chamber 18, through exhaust plenum 12 and out through outlet means 29. If desired, the fan 46 may be placed at outlet 49 and pull air through the apparatus.

The incoming air or other gas in passage 36 may be heated by heating coils 47. A screen or dust filter 50 is provided to remove undesirable particles from incoming air.

The chamber 18 is sealed into place in apparatus 10 by means of inflatable seals 52 and 52a which abut flanges 54 and flange 56 at the top or outlet end 18b and bottom or inlet end 18a, respectively, of chamber 18. These seals are in the form of rubber tubular rings in the shape of an automobile tire innertube. When collapsed, the chamber 18 is readily withdrawn. When the seals 52 and 52a are inflated, they press and seal the space between apparatus 10 and chamber 18 and minimize escape of air passing through the apparatus.

Figure 6:
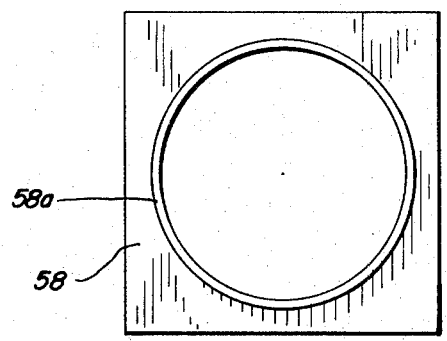
FIG. 6 is a top plan view of the retaining ring structure for the air filter shown in FIG. 1.

Immediately above the chamber 18 there is a retaining ring plate 58, shown also in FIG. 6, which is disposed in chamber 12. Affixed to this retaining structure 58 is a porous bag 60 of cloth or other material which permits passage of air but blocks the transmission of fines from particles undergoing drying in fluid bed chamber 18 and the consequent escape of these fines from exhaust plenum chamber 12. A rod-like support 62 is also shown affixed to wall 14 which prevents collapse of the bag 60 when the air is cut off and possible interference with the withdrawal of the hopper 18 is a result of the bag falling down into interior 19 of chamber 18.

Additional air pollution control from escaping fines is obtained by a final screen 64 in exhaust duct 49 to clear the exhaust stream of particles that might escape through the mesh of bag 60. A damper 66 also serves as an additional control of throughput of air or gas through chambers 36 and 12.

In a typical drying operation chamber 18 containing product is inserted into the apparatus 10. The product may be a finely divided particulate such as granular pieces or noodles of cheese or the like. The seals 52 and 52a are inflated, the heating coils 48 actuated and the fan 46 is activated. Motor 32 is also activated and set to rotate disc 28 which has a diameter of about 6 feet and has two opposed wedge-shaped slots that are 2 inches wide at the center, 12 inches wide at the periphery and about 30 inches long at a predetermined speed of 45 rpm. The disc 28 is spaced about two inches below retaining means 20. As air is passed through the system at a rate of 200 feet per minute, it is heated by the coils 48 and passes through the slots 29 of disc 28 of the bed of product in chamber 18 to fluidize the same. The air streams, after passage through apertured disc 28, have a velocity of about 600 ft./minute and are directed in rotary fashion to and through retaining screen-like element 20, thereby, in effect, creating moving or rotating streams of heated air directed through the bed of particulate to fluidize the solid particulate contained and retained within the chamber 18. During fluidization and drying, particles of the product to be dried are agitated and suspended (fluidized) in a stream of air within chamber 18. The air pressures causes bag 60 to expand and fluidization occurs in the chamber 18. The cloth of the air filter bag 60 prevents the very small fines from escaping from exhaust plenum chamber 12.

The apparatus of the present invention produces locally high velocity rotating air jet action adjacent and below the drier chamber 18 bottom and directed into the chamber 18. It is particularly advantageous in the drying of particulate product which is damp and contains a rather substantial amount of moisture and especially particles which are irregularly shaped and tend to agglomerate, mechanically interlock or perhaps smear, again typified by cheese. The jets of air agitate the fluid bed while the apparatus is in operation, thereby preventing channelizing or local currents or streaming in the fluid bed, thereby producing improved drying. The jets are localized in the disc and extend radially from about the center to a point adjacent the edge thereof. The result of the radially placed aperture in the rotating disc is to produce a fluidization of the entire mass and at the same time provide a rotating wave in the fluidized bed or mass which serves to agitate the mass by virtue of the moving wave front, thereby eliminating channelization and providing rotary agitation and rotary pulsation of the fluidized mass during drying. With this procedure drying temperatures can be considerably increased without adversely effecting the product characteristics and more water can be removed due to a higher air input temperature. Oiling is also minimized. The present invention permits the drying of the product with complete agitation but without the necessity of contacting the product to be dried in the fluid bed with scrapers or agitators which would crush or smear the product.

Accordingly, by the use of the apparatus of the present invention, a process is provided for fluid bed drying and agitation of particulate materials which comprises passing a rotating stream or streams of air through a bed of particulate material to thereby fluidize the same and produce a rotary wave motion in the fluidized bed of particulate, said pulsating or moving wave providing an agitating action in the fluid bed during the drying step.

Figure 7:
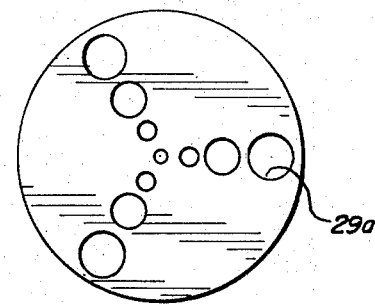
FIGS. 7, and 8 are top plan views of alternate forms of air distributor discs which may be used in the apparatus of FIG. 1
Figure 8:
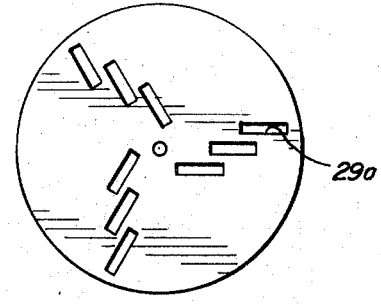

As noted above, the apertures in the disc 28 may be in the form of slots 29 which may be wedged-shaped, square or elongated eliptical apertures. The disc apertures may also be in the form of groups of smaller apertures such as shown in FIGS. 7 and 8 and designated 29a, 29b and 29c. The purpose of the slots is to provide a localized jet action. In the same fashion a plurality of smaller apertures grouped in the disc can function in the same way. The means permitting passage of air should be spaced in the disc and the speed of rotation adjusted so that a wave front can form in the fluid bed, it being understood that if the speed of rotation is excessive or the slots or groups of apertures functioning as a slot are too closely spaced, then the wave front will be less defined and the mixing action reduced.

It should be understood that other embodiments may be employed such as different size slots, different rotation speeds or the like without detracting from the inventive concept as disclosed herein.

What is claimed is:

1. A fluidized bed apparatus for drying of particulate material which comprises:
   a. a vertically disposed fluidizing chamber adapted to contain a product for drying, said chamber having air inlet and outlet passage means;
   b. means for passing a current of air through the fluidizing chamber;
   c. a product supporting means extending across said inlet passage, said means comprising a screen-like element having a plurality of apertures which permit the passage of air through said means but is capable of supporting the product to be dried thereon;
   d. a disc shaped element rotatably mounted below the product supporting means and substantially coextensive therewith adapted to interrupt a current of air passing through the chamber, said disc being provided with apertures therein, the apertures having an area of from one-sixth to one-half of the open area of said retaining means; and
   e. a means for rotating said disc to direct currents of air in rotating fashion through the product supporting means and through product in said chamber.

2. An apparatus according to claim 1 wherein the retaining means has an open area of from 10 to 50 percent.

3. An apparatus according to claim 1 wherein the fluidizing chamber is provided with a porous means disposed across the outlet means to retain product within the chamber.

4. An apparatus according to claim 1 wherein the chamber is cylindrical.

5. An apparatus according to claim 1 wherein the retaining means comprises a screen element and an apertured supporting element.

6. An apparatus according to claim 1 wherein the apertures in said disc are of such area as to provide a local air velocity of from 1½ to 4 times the apparent linear velocity through the screen-like product supporting means.

7. A process for drying a particulate under fluidized bed conditions which comprises maintaining a bed of finely divided particulate material in a fluidizing chamber having an air permeable product retaining means having a predetermined open area in the bottom thereof and passing a rotating current through said product retaining means and said product bed to fluidize the product, said rotating current being provided by rotating air passing apertures having a cross sectional area of from one-sixth to one-half the open area of the retaining means.

8. A fluidized bed apparatus for drying of particulate material which comprises:
   a. a vertically disposed cylindrical fluidizing chamber adapted to contain a product for drying said chamber having air inlet and outlet passage means;
   b. confined passage means for passing a current of heated drying air through the fluidizing chamber;
   c. a product supporting means extending across said inlet passage, said means comprising a screen-like element having a plurality of apertures which permit the passage of air through said means but is capable of supporting the product to be dried thereon, said means having an open area of from 10 to 50 percent;
   d. a disc shaped element rotatably mounted below the product supporting means and substantially coextensive therewith adapted to interrupt a current of air passing through the chamber, said disc being provided with apertures having an area of from one-sixth to one-half of the open area of said retaining means;
   e. a means for rotating said disc to direct currents of air in rotating fashion through the product supporting means and through product in said chamber; and
   f. sealing means for sealing the juncture between the fluidizing chamber and the passage means.

9. A process for drying a delicate product under fluid bed drying conditions and without mechanical agitation which comprises passing a rotating current of air through a body of particulate material at a sufficient air velocity to form fluid bed of said particulate and a rotating wave form therein to provide an agitation to the fluidized bed during the drying step.

10. A process according to claim 9 wherein the rotating air stream has an apparent linear velocity of from 200 to 600 feet per minute.

11. A process according to claim 9 wherein said particulate is cheese.

* * * * *

UNITED STATES PATENT OFFICE
CERTIFICATE OF CORRECTION

Patent No. 3,849,900   Dated November 26, 1974

Inventor(s) Robert F. Dale, Thomas P. Rhodes and Joseph M. DeNucci

It is certified that error appears in the above-identified patent and that said Letters Patent are hereby corrected as shown below:

Col. 2, l. 51 - "one sixteenth" should be "one-sixth"

Col. 3, l. 63 - "nanely" should be "namely"

Col. 5, l. 32 - "trhough" should be "through"

Signed and sealed this 22nd day of April 1975.

(SEAL)
Attest:

RUTH C. MASON
Attesting Officer

C. MARSHALL DANN
Commissioner of Patents
and Trademarks